United States Patent [19]

Nakasaki

[11] 4,258,772

[45] Mar. 31, 1981

[54] AIR VALVE TIGHTENING CONSTRUCTION FOR TIRE TUBE

[75] Inventor: Eiji Nakasaki, Kawogawa, Japan

[73] Assignee: Sumitomo Rubber Industries, Ltd., Kobe, Japan

[21] Appl. No.: 932,162

[22] Filed: Aug. 9, 1978

[30] Foreign Application Priority Data

Aug. 22, 1977 [JP] Japan ..................... 52/112692[U]

[51] Int. Cl.³ ..................... B60C 5/00; B60C 29/00
[52] U.S. Cl. ..................... 152/349; 411/367; 137/223; 152/427; 152/DIG. 8
[58] Field of Search ............... 152/427, 428, 415, 337, 152/338, 341, 342, DIG. 7, DIG. 11, DIG. 8, DIG. 13, 349; 85/32 R; 137/223

[56] References Cited

U.S. PATENT DOCUMENTS

| | | | |
|---|---|---|---|
| 1,467,484 | 9/1923 | Kraft | 152/427 X |
| 1,489,329 | 4/1924 | Kraft | 85/32 R |
| 1,722,783 | 7/1929 | Basseches | 152/427 X |
| 2,731,065 | 1/1956 | Powers | 152/DIG. 11 |
| 3,456,549 | 7/1969 | Horton | 85/32 R |

*Primary Examiner*—William A. Powell
*Assistant Examiner*—Thomas E. Bokan
*Attorney, Agent, or Firm*—Sughrue, Rothwell, Mion, Zinn and Macpeak

[57] ABSTRACT

The present invention provides a tire assembly capable of use with a tire rim of a tube tire having a valve hole with a first diameter and capable of use with a tire rim of a tubeless tire having a valve hole with a second diameter, the first diameter being less than the second diameter, the tire assembly including an inner tube provided with a threaded air valve stem having an outer diameter less than the first diameter, and a tightening nut provided with a thread for threading engagement with the threaded valve stem, the tightening nut provided on one end with a flange portion having an outer diameter substantially equal to the second diameter.

2 Claims, 5 Drawing Figures

AIR VALVE TIGHTENING CONSTRUCTION FOR TIRE TUBE

BACKGROUND OF THE INVENTION

1. Field of the Invention

The present invention relates to a construction of a tightening nut for mounting an air valve of an inner tube to a tire rim.

2. Description of the Prior Art

A conventional air valve mounting assembly for a tire A having an inner tube 3 is shown in FIG. 1. As shown in FIG. 1, an air valve stem 4 made predominantly of rubber is inserted into a valve hole 2 in a tire rim 1 for an inner tube 3, and a nut 4a is tightened onto the air valve 4 inside the tire rim 1 and another tightening nut 5 is tightened onto the air valve 4 provided outside the tire rim 1 so as to tightly mount the air valve 4 thereto.

A conventional air valve mounting construction for a tubeless tire B, as shown in FIG. 2, in which a snap-in type valve 8, for example, a rim valve, is mounted in removable engagement with a valve hole 7 provided in the tire rim 6. Generally, in conventional standardized goods, a diameter $D_1$ of the valve hole 2 of the rim 1 provided for the inner tube tire A is smaller than a diameter $D_2$ of the valve hole 7 of the rim 6 provided for the tubeless tire B.

When the bead portions of a tubeless tire are badly damaged, however, it is impossible to reuse the damaged tubeless tire as a tubeless tire. Such a damaged tubeless tire is usually reused by providing a new inner tube therein as if the tire was a tube tire. In this case, because the diameter $D_2$ of the valve hole 7 of the rim 6 for the tubeless tire B is larger than the diameter $D_1$ of the valve hole 2 of a rim of a corresponding tube tire A, it is necessary that another mechanical part 10, for example, a spacer, be inserted into the valve hole 7 in the tubeless tire rim 6 and the air valve 4 of the inner tube 3 be inserted through the spacer 10 and tightened down by the nut 5 through a washer 9, as shown in FIG. 3. Thus, tire-dealers, repair garages, gasoline stations and the like must always stock such spacers 10 and must expend additional work to mount the air valves 4 in the tubeless tire rim 6.

SUMMARY OF THE INVENTION

Briefly, in order to eliminate the above-noted deficiencies, the present invention provides a tire assembly capable of use with a tire rim of a tube tire having a valve hole with a first diameter and capable of use with a tire rim of a tubeless tire having a valve hole with a second diameter, the first diameter being less than the second diameter, the tire assembly including an inner tube provided with a threaded air valve stem having an outer diameter less than the first diameter, and a tightening nut provided with a thread for threading engagement with the threaded valve stem, the tightening nut provided on one end with a flange portion having an outer diameter substantially equal to the second diameter.

DETAILED DESCRIPTION OF THE INVENTION

The present invention is now described in detail with reference to the accompanying drawings.

Figure 1:
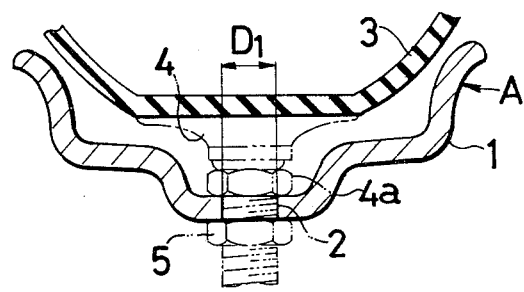
FIG. 1 shows a cross-sectional view of a conventional tube tire rim and a threaded valve stem of an inner tube mounted therein.
Figure 2:
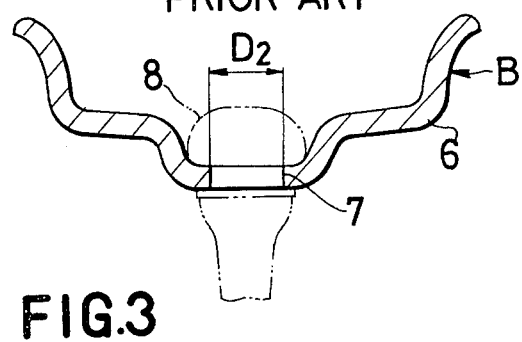
FIG. 2 shows a cross-sectional view of a conventional tubeless tire rim and a tubeless tire valve mounted therein.
Figure 3:
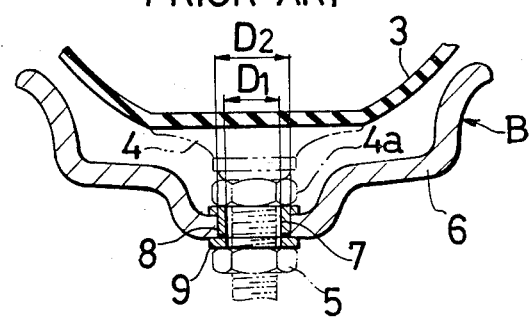
FIG. 3 shows a cross-sectional view of a conventional tubeless tire rim having a threaded valve stem of an inner tube mounted therein.
Figure 4:
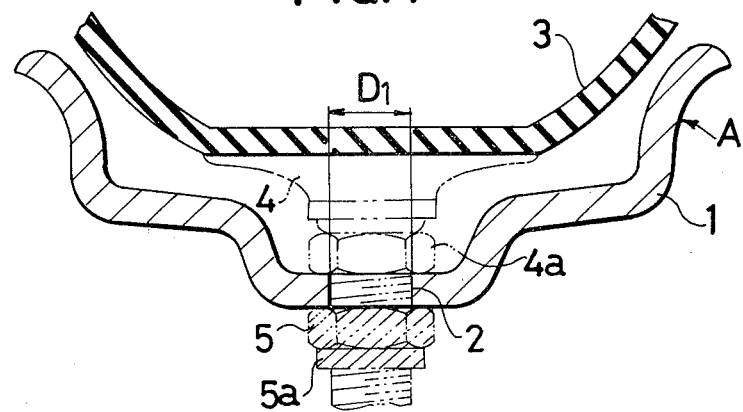
FIG. 4 shows a cross-sectional view of a tube tire rim and a threaded valve stem of an inner tube mounted therein by employing the tightening nut according to the present invention.

As shown in FIG. 4, a threaded air valve 4 of an inner tube 3 provided for a tube tire A has a nut 4a tightened thereon and is inserted through a valve hole provided in the tube tire rim 1. The outer top surface of nut 4a is in touching contact with the adjacent surface of tube tire rim 1. A nut 5 having a flange portion 5a on one end thereof is tightened down on the threaded air valve 4. As shown in FIG. 4, in this case, nut 5 is oriented with respect to the outer surface of the rim 1 so that the flange portion 5a is on the opposite side and is facing away from the outer surface of the rim 1.

Figure 5:
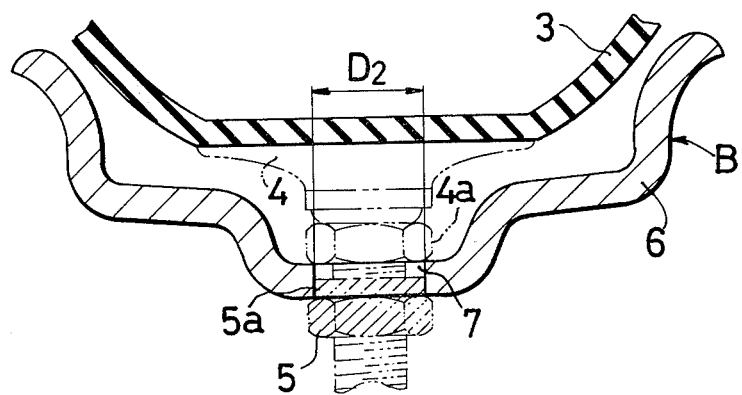
FIG. 5 shows a cross-sectional view of a tubeless tire rim and a threaded valve stem of an inner tube mounted therein by employing the tightening nut according to the present invention.

In comparison, when the tightening nut 5 is used for the rim 6 of the tubeless tire B, as shown in FIG. 5, the orientation of the flange portion 5a with respect to the surface away from the tire is reversed so that the flanged portion 5a is slidably engaged in the hole 7. As such, the flange portion serves as a spacer when the nut 5 is tightened down on the air valve 4.

As mentioned above, the air valve 4 can be mounted either on the tubeless tire rim 6 or on the tube tire rim 1 because of the flanged portion 5a on the tightening nut 5. Accordingly, the spacer which is required in conventional approaches to the problem prior art is unnecessary in the present invention. Further, engaging and tightening of the air valve 4 can be quickly and readily carried out according to the present invention.

Because of the addition of the flanged portion 5a to the tightening nut 5 of the invention, the construction thereof is simple and the tightening nut can be manufactured at low cost. Further, the tightening nut 5 of the invention is easily applicable to the conventional air valve 4.

What is claimed is:

1. A tube assembly in combination with a tubeless tire rim having an air valve hole with a large diameter greater than the smaller diameter of the valve hole in a conventional tube tire rim, said tube assembly comprising:
   (a) an inner tube provided with a threaded air valve stem having an outer diameter less than said smaller diameter;
   (b) reversible tightening nut means provided with a thread for threading engagement with said threaded air valve stem; and
   (c) integral flange means on one end of said nut means for insertion into said large diameter hole and for centering said valve stem in said large diameter hole.

2. An interchangeable valve stem tightening assembly for either a tube tire rim or a tubeless tire rim, where the valve stem opening in the rim of the tube tire has a diameter less than the diameter of the valve stem opening in the rim of the tubeless tire, said assembly characterized by:

(a) an inner tube provided with a threaded air valve stem having an outer diameter less than the diameter of said valve stem opening in the rim of the tube tire; and (b) tightening nut means provided with an internal thread for engagement with said threaded air valve stem, said tightening nut means provided on one end with flanged portion means having an outer diameter substantially equal to the diameter of said valve stem opening in the tubeless tire rim for centering said valve stem in said last-mentioned opening.

* * * * *